Oct. 25, 1960

L. M. KRAUSE 2,957,531

HITCH MECHANISM

Filed Feb. 25, 1957

INVENTOR.
LEONARD M. KRAUSE
BY
James E. Nilles
ATTORNEY.

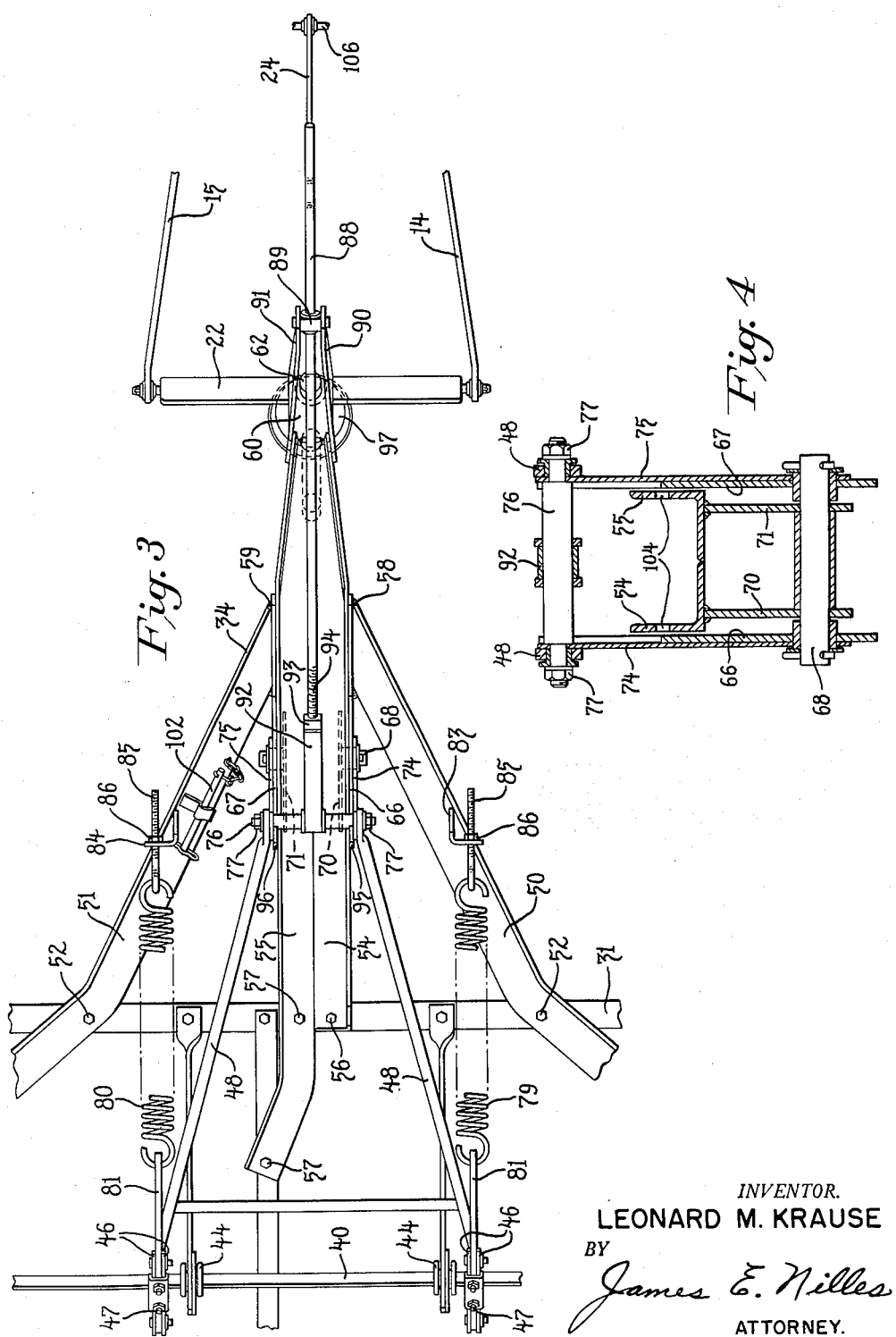

United States Patent Office 2,957,531
Patented Oct. 25, 1960

2,957,531

HITCH MECHANISM

Leonard M. Krause, Toronto, Ontario, Canada,, assignor to Massey-Ferguson Inc., a corporation of Maryland Filed Feb. 25, 1957, Ser. No. 642,264

5 Claims. (Cl. 172—317)

This invention relates to hitches for coupling a tractor having a vertically positionable drawbar to an implement having a vertically adjustable earth working part.

An object of this invention is to provide a hitch for coupling a tractor to an earth working implement, said hitch having means for raising not only the earth working part of the implement but also the implement frame for transport purposes. The hitch further provides that the working depth of the tools will not be appreciably effected by vertical movement of the tractor relative to the implement for example, when passing over undulating ground.

It is another object of the invention to provide a hitch of the above type for connection to a three-point linkage type tractor, said hitch permitting turning of the tractor relative to the implement without affecting the position of earth working tools.

Another object of this invention is to provide a hitch for a grain drill having adjustable earth working tools, said hitch connecting the drill frame and tools to a three-point hitch-type tractor having an elevationally positionable drawbar whereby the frame is raised relative to the ground and the tools are raised not only relative to the ground but also relative to the frame. The hitch also provides that movement of the tractor relative to the drill, in either a vertical or horizontal direction, will have little, if any, effect on the position of the tools.

Other objects and advantages of this invention will become more apparent from the following detailed description and attached sheets of drawing wherein a form of the invention is illustrated.

In the drawings:

Figure 3 is a plan view of the hitch shown in Figure 1, parts being broken away or removed for clarity.

Figure 4 is a sectional view, on an enlarged scale, taken on line 4—4 of Figure 1.

Figure 1:
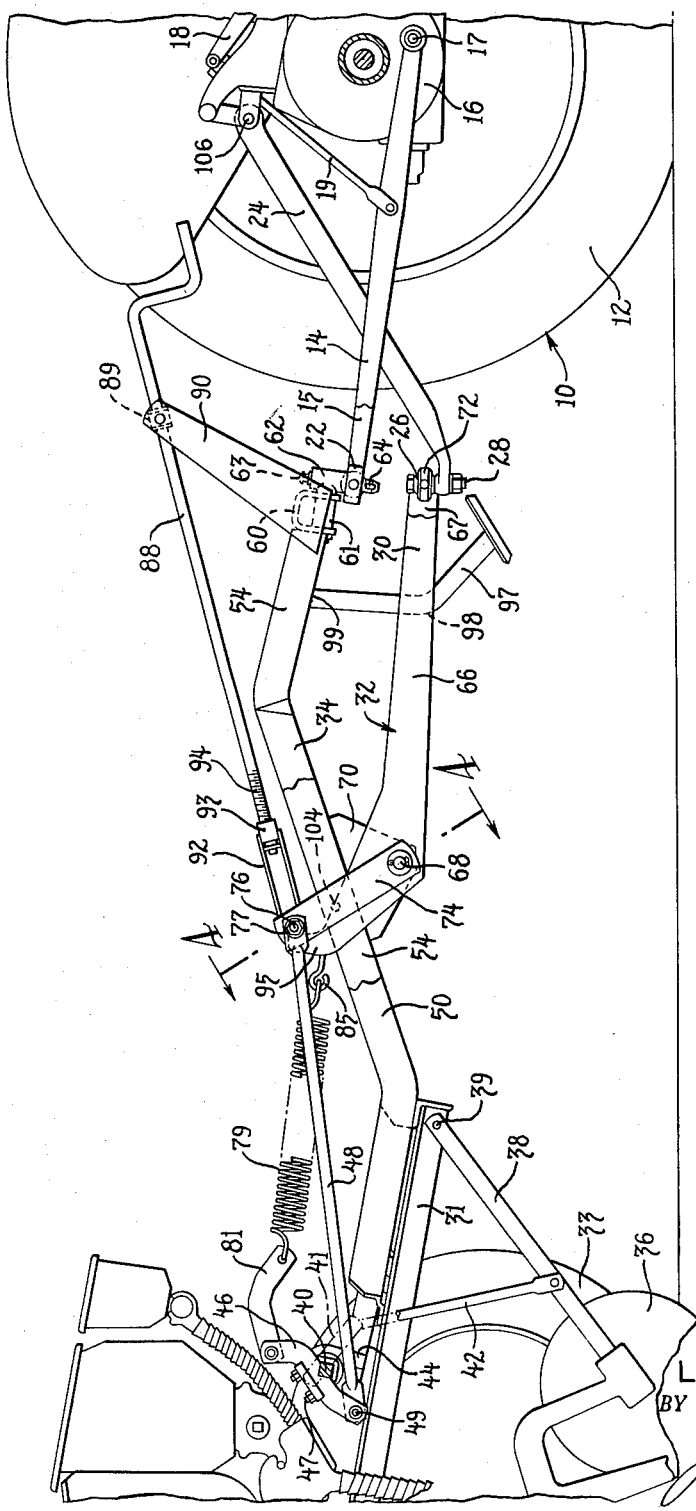
Figure 1 is a right side elevational view showing a hitch made in accordance with the invention and connecting a grain drill to a tractor, certain parts being broken away or shown in section for clarity in the drawing.
Figure 2:
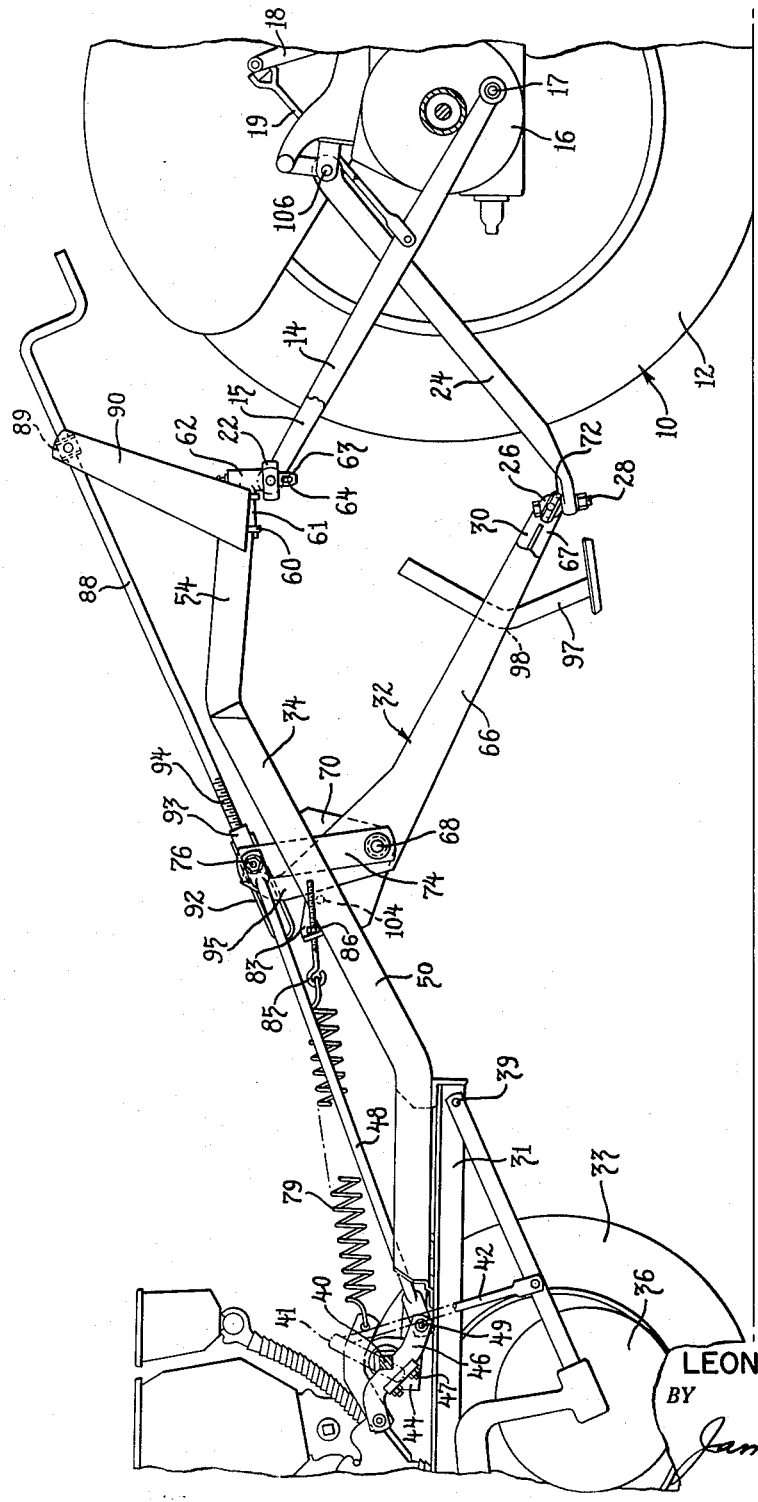
Figure 2 is a view similar to Figure 1 but showing the hitch in the transport position.

Referring more particularly to the drawings, the tractor 10 has a pair of rear traction wheels 12 (only one shown) and a pair of laterally spaced lower drafts links 14, 15 universally attached at their forward ends to the tractor body 16 as at 17. These links are adapted to be vertically positioned by the hydraulically operated lift arms 18 and links 19 in the well known manner. A drawbar 22 is connected between the rear ends of the draft links by the conventional and well known ball and socket swivel joints. An upper link 24 is attached to a central upper portion of the tractor body and extends rearwardly and downwardly therefrom and between the draft links 14, 15. In other words, the draft links and the upper link are crossed as viewed in side elevational (Figs. 1 and 2). The rear end of link 24 has a ball 26 secured thereto by means of bolt 28. This ball forms part of a swivel joint which connects the forward end 30 of an actuating member 32 with the link 24. Link 24 is not positionable in a vertical direction relative to the tractor. It will be noted that the drawbar 22 and ball swivel 26 are aligned in a vertical direction when the implement is in a working position as shown in Figure 1.

The implement that has been chosen for purposes of illustrating this invention is a grain drill. A drill of this general type is shown and describde in U.S. Patent Number 2,763,355, issued September 18, 1956, to Peder Bjerre and entitled "Grain Drill." For purposes of this disclosure it is believed sufficient to only briefly describe this implement here. A main frame 31 is adapted to be moved over the ground on a pair of large ground wheels 33 and has a forwardly extending main hitch bar 34 rigidly secured thereto. A plurality of laterally spaced discs 36 are rotatably mounted on the rear ends of the drag bars 38 and serve to slice through the ground to make a furrow. Bars 38 are pivotally connected at 39 to the main frame and are vertically swingably by rockshaft 40 through the arm 41 rigidly secured to the rockshaft and link 42 which pivotally connects arm 41 and link 42. Rockshaft 40 is rotatably mounted on the main frame in the laterally spaced pillow bearings 44. Two laterally spaced arms 46 are rigidly secured to shaft 40 by the U-bolt clamps 47. Each of the arms 46 has a forwardly extending rod 48 pivotally attached at one of its ends as at 49. The main hitch bar 34 is comprised of forwardly converging angle iron members 50, 51 which are rigidly secured to the main frame 31 in any suitable manner, as by bolt means 52. The hitch bar 34 is also comprised of the central angle iron members 54, 55 which are secured to the main frame by bolts 56 and 57 respectively. The forward ends of converging members 50, 51 are welded to members 54, 55, respectively at 58, 59 to form a rigid hitch. The forward ends of angle members 54, 55 are welded to the inverted U bracket 60 which has a generally horizontal pivot pin 61 extending therethrough. Pin 61 has formed integrally therewith an enlarged vertically disposed portion 62 through which extends a vertical hitch pin 63. This pin 63 also extends through drawbar 22 and is held captive therein by a keeper 64. Thus a universal joint connects the drawbar 22 to the main hitch bar 34. The wide implement is thus free to tilt laterally with respect to the tractor in following the undulations of the ground over which it traverses. The implement is also free to swing laterally about pin 63 with respect to the tractor, as, for example, when turning.

The actuating member 32 takes the form of a large bell-crank and is comprised of two, spaced, vertically positioned, and plate-like members 66, 67 which are pivoted intermediate their length on shaft 68 which in turn is mounted in the spaced gusset plates 70, 71. These gusset plates are welded to the members 54, 55 as shown in Figure 4. The front end of bell crank 32 is mounted on the ball 26 by the complementary clamps 72 connected to and between plate members 66, 67. In this manner the front end of the bell crank is swivelly mounted to the lower end of the fixed link 24.

Also pivotally mounted on each end of the shaft or pin 68 are arms 74, 75 which are connected together at their upper ends by pin 76 extending therethrough. The rockshaft rods 48 are also secured at their forward ends on pin 76. A nut 77 is threadably engaged on each end of pin 76 and rigidly secures the unit together.

Two large coil springs 79, 80 are connected at their rear ends to rockshaft arm 46 by means of the links 81. The forward ends of these springs are adjustably anchored to the brackets 83, 84 which are welded to hitch members 50, 51. This adjustability is by means of the eyebolts 85 which extend through the brackets and are held there by nuts 86. The springs serve to apply downward pressure on the discs to yieldingly hold them in the ground. A large depth adjusting hand crank 88, operable from the tractor seat, is used to vary the pressure applied by the springs to the discs as follows. The crank is rotatably mounted in a trunnion 89 secured between the upper ends of the brackets 90, 91 which are welded to hitch members 54, 55. One end of clevis 92 extends around pin 76 and has a threaded block 93 secured at its other end which the threaded portion 94 of crank 88 engages. By turning the crank, the arms 74, 75 are swung about their pivot shaft 68 and thus adjustably position the rockshaft 40 through rods 48 and arms 46. Rotation of the rockshaft in a clockwise direction (Fig. 1), by means of crank 88 decreases the downward bias on the discs 36 because the tension of springs 79, 80 is correspondingly reduced. It should be noted that the discs are free to rise, notwithstanding the crank adjustment, because of the lost motion or sliding connection between the clevis 92 and pin 76. As shown in Figure 2, the pin 76 has moved forwardly relative to the clevis.

The large bell crank plates 66, 67 terminate at their rear ends in upstanding stop portion 95, 96, respectively, which are adapted to bear against the rear side of pin 76, forming a one-way stop connection between the actuating member 32 and the ground working tools 36. The bell crank and hitch are adjustable vertically, relative to one another, about pivot 68. Stated otherwise, they have a scissors action, and the distance between their front ends can be varied as follows.

The device is shown in Figure 1 in the operative position. The forward pull of the tractor links 14, 24 holds the front ends of the hitch and bell-crank relatively close together. They are held apart as shown by means of the parking stand 97 which is welded to the bell crank as at 98 and its upper end is adapted to abut against the lower side of the hitch member as at 99.

When the discs are in the operating position the geometry of the disc control mechanism is fixed with respect to the implement in general because the front ends of the bell-crank and hitch bar are fixed relative to one another. These ends are kept together in this working position by the draft force of the tractor, the stand 97 providing a stop so as to prevent interference between these parts.

In operation, the working depth of the discs is changed only by vertical movement of the hitch point 63, for example, when the tractor goes over uneven ground. This change in working depth is very slight and in this respect is similar to a conventional pull-type implement. Therefore by means of this articulated or crossed connection, the working depth of the discs is substantially constant when traversing uneven ground.

It should also be noted that the relative position between the discs and drill does not change when the tractor is turned because the pivot points 63, and 26 of the hitch and crank, respectively are in substantial vertical alignment in either the working or transport positions.

To raise the ground working tools 36 from the operating position shown in Figure 1 to the transport position shown in Figure 2, the drawbar 22 is hydraulically raised by the lift arms 18 in the well known manner. This raises the entire hitch and implement and provides very good ground clearance for transport. In an implement of the type shown, this feature is particularly important because the discs are usually incapable of a large amount of rise relative to the implement frame due to interference between the various and numerous parts associated therewith.

As the main hitch bar is raised by the drawbar, and because the front end of the bell-crank remains substantially stationary, the latter pivots about shaft 68 in a clockwise direction as viewed in the figures. The upper stop portions 95, of the bell-crank bear against pin 76, carrying the latter with it as it moves forwardly. This movement raises the discs, relative to the frame, through rods 48, rockshaft 40 and lift arms 42.

If it is desired to remove the implement from the tractor, the drawbar 22 would be raised to its maximum position. A large pin 102, carried on the frame (Fig. 3) is inserted in the apertures 104 of the hitch members 54, 55, the upper portion of the bell crank having moved forwardly of these apertures. This locks the hitch and bell crank together, holding their front ends apart and, as a result, the discs in the raised position. At this stage the drawbar 22 is lowered slightly which takes the load off link 24 and permits the removal of pin 106 and link 24 from the tractor. The drawbar 22 is then lowered further until the stand 97 rests on the ground. The pin 63 can then be removed, disconnecting the hitch from the drawbar. To again connect the implement, the procedure is simply reversed.

It should now be apparent that a simple and effective hitch mechanism has been provided, which utilized only the standard three points of connection of the common three point hitch type of tractor. The attachment or disconnection of the implement can be made with only two pins, leaving the tractor in condition to accept other three point hitch implements without the necessity of adding or removing special attaching parts.

It should be understood that it is not intended to limit the invention to the above described forms and details, and that the invention includes such other forms and modifications as are embraced by the scope of the appended claims.

I claim:

1. A hitch mechanism for an implement having a main frame and an earth working tool vertically positionable relative to said frame, said mechanism including, a forwardly extending main hitch bar rigidly secured at its rear end to said frame and having means at its front end for pivotal attachment to a vertically positionable drawbar of a tractor, an actuating member pivotally secured intermediate its ends to said hitch bar rearwardly of its pivotal connection with the draw bar, said member having means at its front end for pivotal attachment in vertically fixed relation to said tractor and at a location in substantial vertical alignment with the pivot of said front end pivot means of said hitch bar, and a linkage interposed between the rear end of said member and said tool operative when said front end of said hitch bar is raised to correspondingly raise said tool.

2. A device as defined in claim 1 including means for locking said member and said actuating hitch bar together when the latter is raised.

3. A hitch mechanism for an implement having a main frame and an earth working tool vertically positionable relative to said frame, said mechanism including, a forwardly extending main hitch bar rigidly secured at its rear end to said frame and having means at its front end providing a pivotal connection with a vertically positionable drawbar of a tractor, an actuating member pivotally secured to said hitch bar intermediate the length of both the member and said hitch bar and at a point located substantially to the rear of the connection with the tractor draw bar, said member having means adjacent its front end pivotally secured in vertically fixed relation to said tractor and at a location in substantial vertical alignment with the pivot for said front end of said hitch bar, and a linkage including a one-way stop connection interposed between the rear end of said member and said tool operative when said front end of said hitch bar is raised to correspondingly raise said tool.

4. In combination with a tractor having a pair of vertically positionable, laterally spaced, lower draft links pivotally secured at the rear end of said tractor, a drawbar secured between the rear ends of said links, and an upper central hitch link secured to said tractor and extending rearwardly and downwardly between said draft links and crossing said links when viewed in elevation, a hitch mechanism for an implement having a main frame and an earth working tool vertically positionable relative to said frame, said mechanism including, a forwardly extending main hitch bar rigidly secured at its rear end to said frame and universally secured at its front end to said drawbar, an actuating member pivotally secured on a generally horizontal axis to said hitch bar intermediate the length of both said member and hitch bar, said member having its front end swivelly secured to said central link and at a location below and in substantial vertical alignment with said front end of said hitch bar, said member also having its rear end extending above said hitch bar, a linkage having a one-way stop connection interposed between the implement tool and said member operative when said front end of said hitch bar is raised to correspondingly raise said tool, and means cooperating with said member for retaining said tool in raised position to condition the implement for transport and storage purposes.

5. A hitch mechanism for an implement having a main frame, an earth working tool, means supporting said tool on said frame for movement between a lowered operating position and a raised transport position, and spring means acting on said supporting means yieldably urging said tool toward the operating position, said hitch mechanism including an elongated hitch bar rigidly connected at one end to the implement frame and having means at its other end for connection with the vertically positionable drawbar of a tractor, a member pivoted intermediate its ends on said hitch bar and having means at one end for connection in vertically fixed relation to the tractor, said hitch bar and said member tending to swing together when the tractor drawbar is lowered to working position and to swing apart when the tractor drawbar is raised from working position, a linkage interposed between the tool supporting means and said hitch bar including manually operable means for adjusting the position of the tool, and a pin constituting a part of said linkage positioned for engagement by the other end of said member as the member and hitch bar are swung apart for actuating the linkage to raise the tool.

References Cited in the file of this patent

UNITED STATES PATENTS

| | | |
|---|---|---|
| 2,552,891 | Evans et al. | May 15, 1951 |
| 2,714,846 | Robinson et al. | Aug. 9, 1955 |
| 2,788,727 | Bonnel | Apr. 16, 1957 |